Patented Sept. 11, 1951

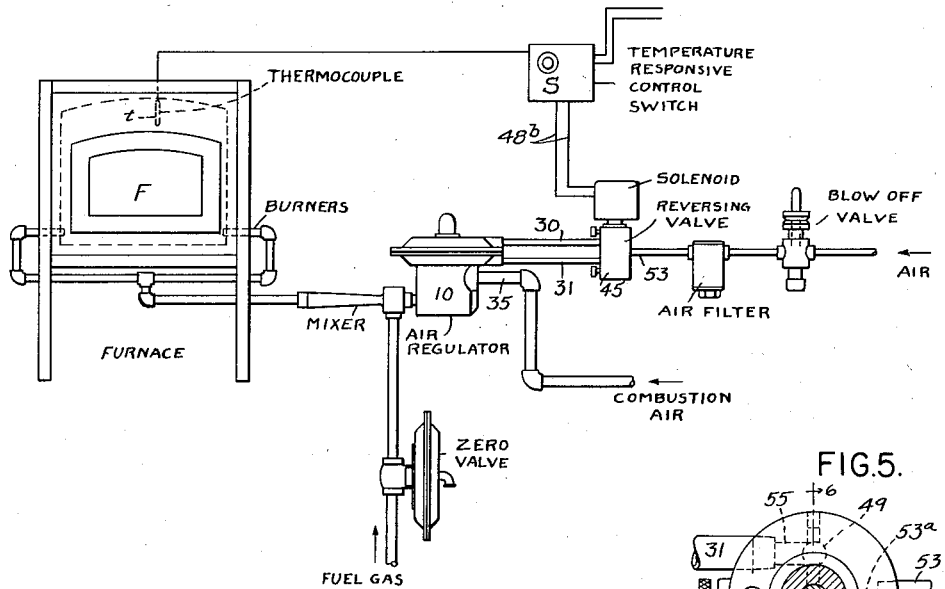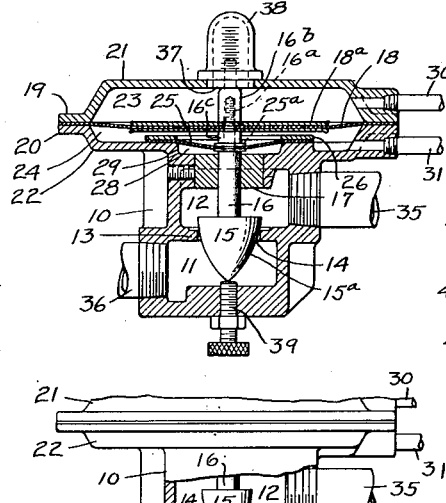

2,567,892

UNITED STATES PATENT OFFICE 2,567,892

FURNACE TEMPERATURE REGULATOR

Philip C. Osterman, Elizabeth, N. J., assignor to American Gas Furnace Company, Elizabeth, N. J., a corporation of New Jersey Application December 27, 1946, Serial No. 718,844

7 Claims. (Cl. 236—15)

The present invention relates to furnace controls and more particularly to an improved method and means for controlling the supply of combustible mixture to the burners of the furnace whereby to maintain uniform, a desired temperature within the furnace. When applied to a metal heat treating furnace, the present invention enables the operator to obtain and thereafter maintain, within close limits, a selected temperature throughout a heat treating process without further attention.

Prior to this invention, attempts have been made to maintain a selected furnace temperature but the devices employed lacked the degree of sensitivity that is essential in the metal processing field. That is to say, with the prior temperature controls, there occurred considerable time lag between the maximum and the minimum points at which the control responded which brought about undesirable changes in furnace temperature. Moreover, in the prior controls the movement of the movable element, such as the stem of a control valve, did not have any particular relation to the size of the flow orifice. As the valve stem moved a unit distance in response to the action of a temperature responding mechanism, the valve orifice was disproportionately increased or decreased and the non-uniform or varying rate of flow resulting produced an erratic action in the combustion chamber. When the control was applied to the furnace fuel stream or the stream of air supplied for combustion, the slow response accompanied by wide temperature fluctuations, became increasingly more objectionable.

The aim of the present invention is to overcome the objectionable features of prior controls and to provide a means for maintaining a uniform furnace temperature over long periods and without undue fluctuations having regard to the fact that the furnace will be opened and closed occasionally for the purpose of inserting and removing the work.

The invention further aims to provide a control, more particularly adapted to govern the flow of a gaseous medium, e. g. air for combustion, to the furnace and to construct a mechanism having the ruggedness and durability necessary for that purpose for long periods of usage without loss or impairment of sensitivity in its governing action.

In attaining the objectives of the invention, a system is proposed wherein a valve is embodied and arranged to be operated in each direction (opening and closing) preferably by air pressure. The valve is constructed with a variable orifice whose flow area is caused to vary in direct proportion to the extent the movable element thereof is shifted. And it is further proposed to control the movement of such a valve with another valve, of the reversing type, and to effect actuation of the reversing valve by means responsive to the temperature of the furnace. To that end, the reversing valve is constructed to be actuated to one effective position by an electric solenoid and to its other effective position by gravity or spring pressure. The reversing valve and the main flow control valves are, furthermore, constructed and related in a manner such that in the case of a failure in the air supply, the flow controlling valve will move toward its closed position, and in the event of a failure in the electrical controls, the reversing valve will move to a position that will effect the closing of the main flow control valve. The solenoid, in turn, is controlled by a temperature responsive switch mechanism, of known design, as will be understood. During the normal operation of the system, the reversing valve functions to operate the flow control valve so as to maintain the furnace temperature uniform.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Figure 1 of the drawings represents a furnace, and its fuel system, embodying the present invention.

Fig. 2 is an enlarged sectional view of an improved valve for controlling the combustion air to a furnace.

Fig. 3 is a view of a portion of the valve illustrated in Fig. 2, and showing a variant form of connection.

Fig. 4 is an elevational view of a reversing valve adapted to control the operation of the valve shown in Figs. 2 or 3.

Fig. 5 is a plan view of the valve of Fig. 4.

Fig. 6 is a vertical sectional view of the reversing valve, taken along line 6—6 of Fig. 5.

Before explaining the structure and operation of the individual elements of this improved control system, a description of the system and its operation will be given. Referring to the schematic diagram, Fig. 1, the furnace therein represented is a standard gas fired type of construction having one or more gas burners adapted to burn a mixture of fuel gas and air. The fuel gas is supplied from the line marked "fuel gas" and its pressure ahead of a mixer is held constant by a pressure regulating valve called a "zero valve." From the zero valve the gas is led into the side opening of a conventional Venturi air and gas mixer, from whence it is directed to the burners of the furnace.

The air for supporting combustion is derived from the line marked "combustion air" and its flow to the Venturi tube is controlled by the valve marked "air regulator." The air regulator, in accordance with this invention, is air actuated, and the supply of actuating air thereto is controlled by a solenoid operated reversing valve, so marked and connected as illustrated. The solenoid in turn is controlled by a temperature responsive control switch whose temperature sensitive element "thermocouple" is located in the furnace chamber. The actuating air is derived from the line marked "air" which, passes through a "blow off valve" that limits the maximum pressure, thence through an "air filter," and the filtered air at a substantially constant pressure is led into the "reversing valve." Assuming that the switch of the solenoid control valve is closed when the furnace is started, the solenoid will be energized and the valve plunger lifted to a position such that air under pressure is directed to the air regulator through the lower pipe connection 31 illustrated in Fig. 1, and the air regulator valve port will be open permitting combustion air to flow to the mixer and to the burners. When the furnace attains the desired heat, the solenoid control switch opens and the solenoid is deenergized. Thereupon the plunger of the reversing valve moves to its other effective position, and closes off the flow of air in line 31 to the regulator and directs air through the upper connection, line 30, to the regulator which moves the valve plunger toward its closed position. The decrease in combustion air, effects eventually a lowering of the furnace temperature and when the temperature reaches the limit of the fluctuation range set, the solenoid switch is caused to close and the air regulator is caused to respond in an opening direction allowing increased air flow therethrough. This cyclic operation continues automatically to hold the temperature within the prescribed limits.

For convenience in illustrating the connections of the various elements, the several pipe lines have been shown as straight lines, but it will be understood that the connections include, unions, cut off valves, etc. in the lines in accordance with standard furnace practice.

Now referring more particularly to Fig. 2 of the drawings the air regulator comprises a hollow body member 10 having an upper chamber 12 and a lower chamber 11 separated by a partition wall 13. The wall 13 is centrally ported to form a flow orifice and valve seat 14 for the head end of a valve plunger 15. The plunger 15 is provided with an upwardly extending stem 16 that passes through a bushing 17 and is secured to the central portion of a rubber or metal diaphragm 18. The diaphragm is secured around its periphery between the upper and lower flanges 19 and 20 provided by housing members 21 and 22 respectively. The housing members are shallow and saucer shaped and form with the diaphragm an upper chamber 23 and a lower chamber 24, the lower chamber 24 being sealed off from the upper valve chamber 12 first by a supplementary diaphragm 25 and also by the bushing 17. The diaphragm 25 is secured to the lower housing member 22 by a ring element 26 and screws (not shown) and to the stem 16 of the valve plunger 15. The stem 16 of the valve is formed with a reduced and threaded extension 16a on the upper end of which a pilot nut 16b is threaded. Washers 25a are disposed at opposite sides of the diaphragm 25, then a washer like spacer 16c is applied over the extension 16a and then the diaphragm 18, reinforced by discs 18a is mounted upon the extension, and all of the elements clamped in position against the shoulder afforded by the stem 16, by the pilot nut 16b. The diaphragm 25 operates in a depression 28 formed in the body member, from which an air bleeding duct 29 leads to the atmosphere. Metallic bellows may, of course, be employed in place of either or both of the diaphragms.

Valve actuating air is caused alternately to enter the upper chamber 23, above the diaphragm 18, via the pipe connection 30, and enter the lower chamber 24 via the pipe connection 31 therewith, as will hereinafter be explained.

Combustion air is led into the chamber 12 above the valve head 15 by pipe connection 35, and after passing through the valve orifice 14 into chamber 11, is conducted by the connection 36, which may if desired be the aspirating end of the conventional Venturi mixer, to the point of use.

The cover member 21 of the main diaphragm housing is provided with a central opening 37 through which the pilot end of the screw 16b may extend. And a cap element 38, preferably of transparent material, is provided to form a sealed enclosure. By constructing the cap 38 of transparent material the operator may observe the position of the end of the pilot 16b, which also indicates the position of the valve 15, and either the pilot 16b or the transparent cap 38 may be calibrated so that valve position readings may be noted from time to time.

At the underside of the valve body 10 an adjustable stop screw 39 is provided, the inner end of the screw passing into the chamber 11 and against which the valve plunger 15 may abut whenever it is desired to limit the movement of the plunger so that it will always pass at least an "idling" amount of air.

The instant valve is best adapted for vertical movement of the plunger 15 relative to its seat so that advantage of gravity movement in one direction, in the event of failure in actuating pressure, is attained. In utilizing that advantage, it is proposed to fashion the valve head 15 and the cooperating valve seat 14 so that in the event of power failure, it will fall toward its closed position. Furthermore as hereinafter mentioned, the invention aims for a valve construction that will provide a flow orifice, in sectional area, that is directly proportionate to the movement. Accordingly, the valve plunger head 15 is given a tapered shape of varying diameter so that the area of the ring space formed between the periphery 15a of the head 15 and the seat 14 is directly proportional to the extent of plunger movement in all sectional planes of the conical head 15. The shape of head 15 is readily determined by computing the ring area required at uniformly spaced planes of the cone and plotting the curve. The smaller the increment between planes, the closer will be the theoretically correct curve resulting.

The form of valve depicted in Fig. 3 is constructed similar to the valve of Fig. 2, with the exception that the chamber 11 of the Fig. 2 valve is eliminated, and the end of the injector tube 41 of the Venturi mixer is threaded into the wall 13, and its hollow interior 41a forms the valve orifice and seat for the head 15.

Figs. 4, 5, and 6 show the construction of a preferred form of reversing valve designed to cooperate with and to control the action of the air regulating valve. The reversing valve comprises a body member 45 provided with a centrally located bore 46 therein and in which a valve plunger 47 is mounted for reciprocation. The body member 45 is formed with a recess 45a in its upper end into which a portion of the housing of a solenoid 48 is threaded or otherwise secured. The valve plunger 47 extends through the upper end of the valve body and into the solenoid 48 wherein it forms an armature 47f of the solenoid. If desired the armature with which the solenoid is equipped may be separably connected to the end of the valve plunger in any convenient manner. The solenoid is in other respects of conventional construction and provided with the usual leads 48b.

The valve plunger 47 is formed with two reduced portions 47a and 47b intermediate its ends, and with three raised portions 47c, 47d, and 47e, which form valve portions.

The valve body is also provided with three bores 49, 50 and 51 arranged parallel to the vertical bore 46 and spaced therefrom, the two bores 49 and 50 lying in a diametral plane of the body and the bore 51 being 90° removed therefrom. Bore 51 constitutes an exhaust conduit and communicates with the valve bore 46 near the upper and lower ends thereof by means of cross ports 51a and 51b. The open end of the exhaust conduit is directed toward the solenoid 48 and the exhaust air tends to cool the coil. The bores 49 and 50 also communicate with the valve bore 46 by means of cross ports 49a and 50a respectively. Medially of the valve bore 46 another conduit 53a is formed, which is threaded at its outer end to receive an air line connection 53. And above and below the air conduit 53a, additional ports 54 and 55 are provided, each having a threaded outer end for the connection of air lines 30 and 31 respectively. The air lines 30 and 31 connect with the diaphragm chambers 23 and 24 of the air regulator previously described. The inner ends of the ports 54 and 55 communicate with bores 50 and 49 respectively. The high portions or lands 47c, 47d, and 47e, as well as the valve conduits 49a, 50a, and 53a, are so proportioned and spacially related that when the valve plunger 47 is in its uppermost position (Fig. 6) air supplied via line 53 flows through port 53a, around the reduced portion 47b, through port 49a into bore 49 and thence through conduit 55, and line 31 to the chamber 24 under the diaphragm 18 of the regulator. Air expelled from the chamber 23 above the diaphragm 18, passes via line 30, port 54, bore 50, port 50a, bore 46 under the end of the valve plunger 47, port 51b, and bore 51 to the atmosphere. When the valve plunger is in its lowermost position (dotted line position, Fig. 6) the air pressure is directed through line 30 to the upper side of the diaphragm 18 and the expelled air passes via line 31, port 55, bore 49, port 49a, around reduced portion 47a, port 51a, to the exhaust conduit 51 and the atmosphere. Flow rate control valves such as needle valves 51c and 51d are embodied in the exhaust conduits 51a and 51b respectively. These valves are manually adjustable and provided to control the rate of escape of air from the diaphragm housing of the regulator valve.

Movement of the reversing valve plunger 47 is effected by the solenoid 48. When the solenoid is energized the valve is raised (to its full line position, Fig. 6) and when it is deenergized the valve plunger drops to the dotted line position (Fig. 6). Control of the action of the solenoid is exercised by a temperature responsive switch S, of conventional design, having a thermocouple t which extends into the heating chamber of the furnace F, as will be understood.

In the event of electric power failure, or when the furnace is closed down, the solenoid 48 is deenergized and the plunger 47 of the reversing valve drops down and air under pressure is directed to the upper side of the diaphragm 18 of the air regulator and the valve 15 thereof moves toward its closed position which shuts off the air supply to the burners. Also, in the event of a failure in the supply of control air (line 53), the regulating valve plunger 15 will move (or remain) in its closed position as limited by the screw 39.

During normal operation, the temperature responsive switch S continually responds to the furnace temperature to energize and deenergize the solenoid of the reversing air control valve. The furnace, on cooling below the setting of the controls of the temperature switch, calls for more air, and the air regulator moves toward open position, and when the furnace temperature is raised to the point required, the system functions automatically to reduce the air supply. During the operation of the controls the solenoid actuated reversing valve operates back and forth causing the air regulator valve plunger 15 to take up and hold a position such that the volume required to produce a predetermined furnace heat passes the regulator. It will be noted also that the response of the air regulating valve 10 to a repositioning of the reversing valve is relatively slow insofar as the extent of movement of the head 15 is concerned, so that surging in the flow of combustion air is avoided. The rapidity at which the valve orifice 14 of the regulator is varied is controlled, in this instance, by the needle valves 51c and 51d in the exhaust conduits of the reversing valve. By adjusting the needle valves so that the exhausting air from the upper and lower sides of the main diaphragm of the air regulator, is caused to bleed relatively slowly to the atmosphere, the air pressure that is causing the valve of the regulator to move, cannot effect movement of the valve head very rapidly and hence the size of the flow orifice changes slowly. Manifestly, one of the needle valves, for example the valve 51c that controls the rate of closing of the air regulating valve, may if desired be cracked more than the valve 51d which controls the rate of opening of the air regulating valve so that the optimum furnace temperature is not exceeded because of any lag in valve movement.

By so controlling the rate of movement of the valve head 15 of the regulator undue fluctuations in furnace temperature are avoided, and the air regulating valve will, in effect, be held in a state of equilibrium, moving only gradually one way or the other even though the shifting of the solenoid operated reversing valve is effected quickly. Moreover, by so constructing the valve orifice of the regulator so that its flow opening is directly proportional to the extent of movement of the valve stem, the volume of air flowing through the orifice changes incrementally and decrementally in direct relation to the rate of valve stem movement, the latter being controlled to a nicety by the needle valve 51c and 51d. As the quantity of air supplied to the furnace for combustion at any given time is a prime factor in regulating the resulting temperature, the progressive increase or decrease in volume afforded by the present invention insures against any sudden change in temperature. In this way the furnace temperature is held substantially constant throughout a given work heating period thereby insuring uniformity in the character and quality of the work that is treated therein.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:

Having thus revealed this invention, I claim as new and desire to secure the following combinations and elements or equivalents thereof, by Letters Patent of the United States:

1. A temperature control system for a furnace having combustion air conduit comprising a regulating valve in the combustion air conduit, air operated means for actuating said regulating valve alternately in a valve opening direction and in a valve closing direction, means including a temperature responsive element connected with the furnace and mechanism operatively responsive thereto comprising switch means and an electrically operable solenoid for controlling the action of said air operated means, and means for controlling the rate of actuation of said regulating valve in each of its directions of movement in response to the action of said means including a temperature responsive element.

2. The combination set forth in claim 1 in which said control means for the air operated means also includes a reversible air control valve connected with a substantially constant pressure source of filtered air, said air control valve also being operatively connected to said regulating valve, and comprising throttle valve means in the return connections between said air control valve and said regulating valve for limiting the rate of flow of air from said valve whereby to control the rate of response of said regulating valve.

3. A means for controlling the temperature of a furnace, said furnace having an air line connected therewith adapted to supply air for combustion to the fuel burner, comprising an air regulating valve in the combustion air line operable to control the flow of combustion air, means for actuating said regulating valve comprising an air operated reversible motor and another control valve of the reversing type connected with a substantially constant pressure source of filtered air, said control valve being operatively connected also to said reversible motor so as to effect actuation of the latter in reverse directions and thereby actuation of said regulating valve in an opening and in a closing direction alternately, and means for limiting the rate of response of said regulating valve to the action of said air motor in each of its directions of movement to a valve effective to maintain a substantially uniform temperature within the furnace; control means for said reversing valve, and means including a temperature responsive element connected with the furnace and an electrically operable solenoid operatively connected with said reversing valve for governing the action of said reversing valve.

4. A temperature control system for a furnace having a combustion air conduit, comprising air valve means in the air conduit for regulating the flow of combustion air to the furnace, said valve embodying a vertically disposed movable valve member and an underlying complementary valve seat, air operated means normally effective to raise the valve member whereby to open the valve to flow therethrough and to lower the valve member whereby close the valve to the flow of air therethrough, a separate valve for controlling the flow of actuating air to said valve means comprising a vertically arranged axially movable piston member having an upper and a lower position of shift and a relatively stationary coacting casing, said casing and piston members being ported and connected with said air operated means as to effect an upward movement of said movable valve member when said piston is in its upper shifted position, and a downward movement of said movable valve member when said piston is in its lower shifted position, electrically operated means comprising a solenoid for actuating said valve piston member to its upper position, means normally responsive to a given drop in the temperature of the furnace to energize said solenoid whereby to actuate said piston upwardly relative to said casing and operative on failure of said electrically operated means to release the piston so as to permit return movement of the piston to its downward position of shift, and means operative on failure of a supply of actuating air to effect movement of the valve member of said air valve means toward its valve closed position.

5. The combination of claim 4 in which the movable member of said air valve means is generally tapered and its said valve seat is annular and of a diameter less than the maximum diameter of the said movable member.

6. The combination of claim 1 in which the said regulating valve embodies a movable valve element and a cooperating stationary valve seat of annular contour and in which the movable element is exteriorly contoured so as to afford variations in air flow substantially directly proportionate to unit increments of linear movement of the element relative to its said seat.

7. The combination of claim 6 including indicating means operatively associated with the movable element of the regulating valve to provide visual indication of the position of the valve elemen relative to its seat at any given time.

PHILIP C. OSTERMAN.

REFERENCES CITED

The following references are of record in the file of this patent:

UNITED STATES PATENTS

| Number | Name | Date |
|---|---|---|
| 1,037,337 | Schwabach | Sept. 3, 1912 |
| 1,165,098 | Herr | Dec. 21, 1915 |

(Other references on following page)

| Number | Name | Date |
|---|---|---|
| 1,763,666 | Machlet | June 17, 1930 |
| 1,788,925 | McKee | Jan. 13, 1931 |
| 1,820,510 | Tuck | Aug. 25, 1931 |
| 2,014,906 | Munoz | Sept. 17, 1935 |
| 2,081,170 | Dreffein | May 25, 1937 |
| 2,162,779 | Leutwiler | June 20, 1939 |
| 2,167,281 | Monroe | July 25, 1939 |
| 2,237,038 | Moore | Apr. 1, 1941 |
| 2,251,019 | Mawha | July 29, 1941 |
| 2,265,599 | Griffey | Dec. 9, 1941 |
| 2,266,871 | Krogh | Dec. 23, 1941 |
| 2,270,037 | Corbin | Jan. 13, 1942 |
| 2,297,535 | Bryant | Sept. 29, 1942 |
| 2,320,905 | Bateholts | June 1, 1943 |

OTHER REFERENCES

Eckman, pages 88, 90, 91, 215 and 216 of "Principles of Industrial Process Control" by S. P. Eckman, published 1945, by John Wiley and Sons.